US012608300B2

(12) United States Patent
Berko et al.

(10) Patent No.: US 12,608,300 B2
(45) Date of Patent: Apr. 21, 2026

(54) ACTIVE ANALYTICS

(71) Applicant: The Travelers Indemnity Company, Hartford, CT (US)

(72) Inventors: Alex S. Berko, West Hartford, CT (US); Brian Grady, Manchester, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 512 days.

(21) Appl. No.: 17/959,757

(22) Filed: Oct. 4, 2022

(65) Prior Publication Data

US 2024/0111665 A1 Apr. 4, 2024

(51) Int. Cl.
*G06F 11/3698* (2025.01)
*G06F 11/3668* (2025.01)
*G06F 21/62* (2013.01)

(52) U.S. Cl.
CPC ...... *G06F 11/3688* (2013.01); *G06F 11/3692* (2013.01); *G06F 11/3698* (2025.01); *G06F 21/6245* (2013.01)

(58) Field of Classification Search
CPC ............. G06F 11/1688; G06F 11/3644; G06F 11/3692; G06F 21/6245; G06F 11/3698; G06F 11/3684
See application file for complete search history.

(56) References Cited

U.S. PATENT DOCUMENTS

| | | | | |
|---|---|---|---|---|
| 6,633,878 B1 * | 10/2003 | Underwood | ........... | G06Q 10/10 |
| | | | | 707/999.102 |
| 10,810,110 B1 * | 10/2020 | Thomas | .............. | G06F 11/3688 |
| 11,372,744 B1 * | 6/2022 | Colwell | .............. | G06F 11/3664 |
| 2009/0307763 A1 * | 12/2009 | Rawlins | .............. | G06F 11/2294 |
| | | | | 714/E11.002 |
| 2011/0231822 A1 * | 9/2011 | Sabin | .................. | G06F 11/3688 |
| | | | | 717/124 |
| 2014/0047417 A1 * | 2/2014 | Kaasila | .................. | H04L 43/14 |
| | | | | 717/135 |

(Continued)

FOREIGN PATENT DOCUMENTS

| | | | | | |
|---|---|---|---|---|---|
| CN | 110389900 A | * | 10/2019 | ............. | G06F 16/21 |
| CN | 110659171 A | * | 1/2020 | ............. | G06F 11/221 |
| CN | 113641397 A | * | 11/2021 | .............. | G06F 8/70 |

*Primary Examiner* — Ali S Abyaneh
(74) *Attorney, Agent, or Firm* — CANTOR COLBURN LLP

(57) ABSTRACT

A system includes a network interface configured to access a test script repository, a processing system in communication with the network interface, and a memory system in communication with the processing system. The memory system stores instructions that when executed by the processing system result in configuring a management script associated with a test script of the test script repository to set one or more environment variables used by the test script, the test script configured to test a software component, executing the management script at a scheduled frequency to trigger testing of the software component by the test script, accessing one or more results of executing the test script, comparing the one or more results to a plurality of test criteria to determine a test execution summary, and triggering an alert to notify a service based on the test execution summary indicating a target condition.

24 Claims, 16 Drawing Sheets

1300

Configure a management script associated with a test script of the test script repository to set one or more environment variables used by the test script, the test script configured to test a software component — 1302

Execute the management script at a scheduled frequency to trigger testing of the software component by the test script — 1304

Access one or more results of executing the test script — 1306

Compare the one or more results to a plurality of test criteria to determine a test execution summary — 1308

Trigger an alert to notify a service based on the test execution summary indicating a target condition — 1310

(56)            References Cited

U.S. PATENT DOCUMENTS

2015/0100829 A1 *    4/2015   Nanjundappa ...... G06F 11/3688
                                                714/38.1
2021/0392144 A1 *  12/2021   Vaidyanath ......... H04L 63/1433

* cited by examiner

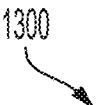

1300

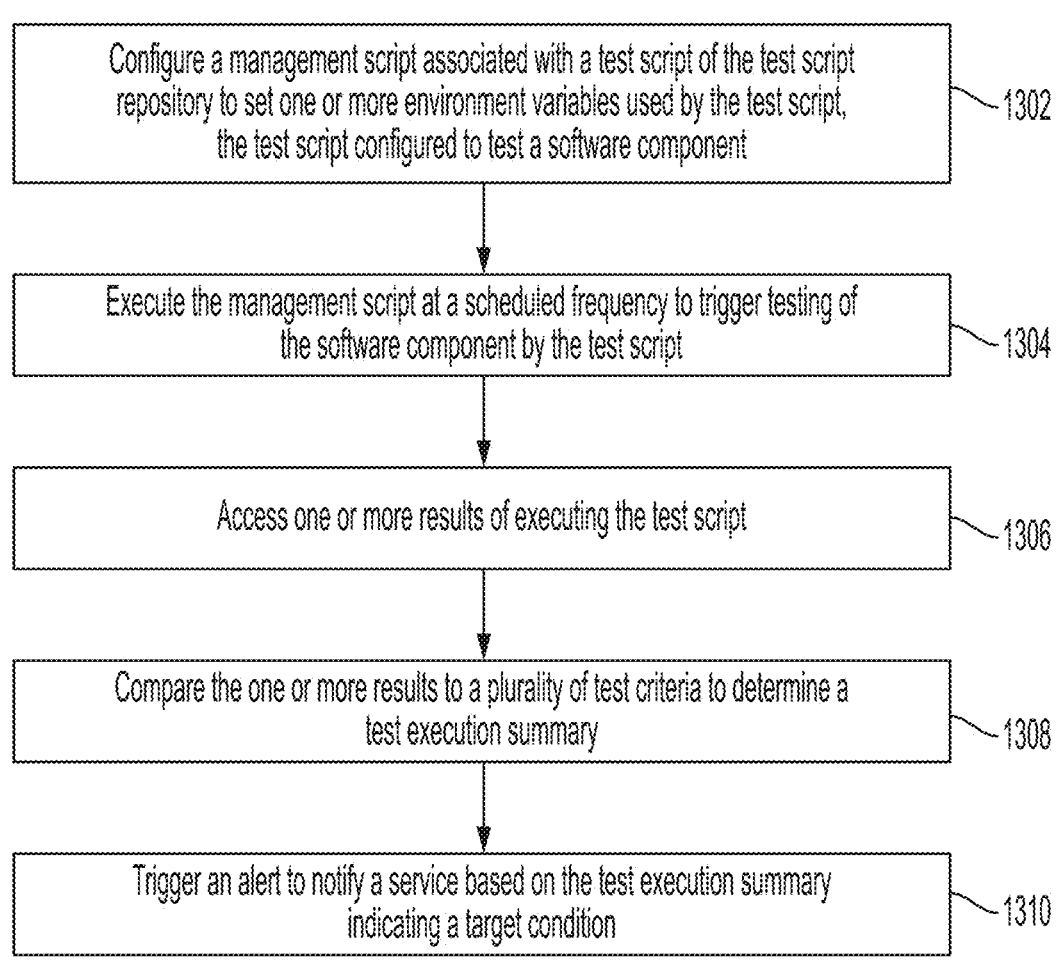

Configure a management script associated with a test script of the test script repository to set one or more environment variables used by the test script, the test script configured to test a software component ⟶ 1302

Execute the management script at a scheduled frequency to trigger testing of the software component by the test script ⟶ 1304

Access one or more results of executing the test script ⟶ 1306

Compare the one or more results to a plurality of test criteria to determine a test execution summary ⟶ 1308

Trigger an alert to notify a service based on the test execution summary indicating a target condition ⟶ 1310

FIG. 13

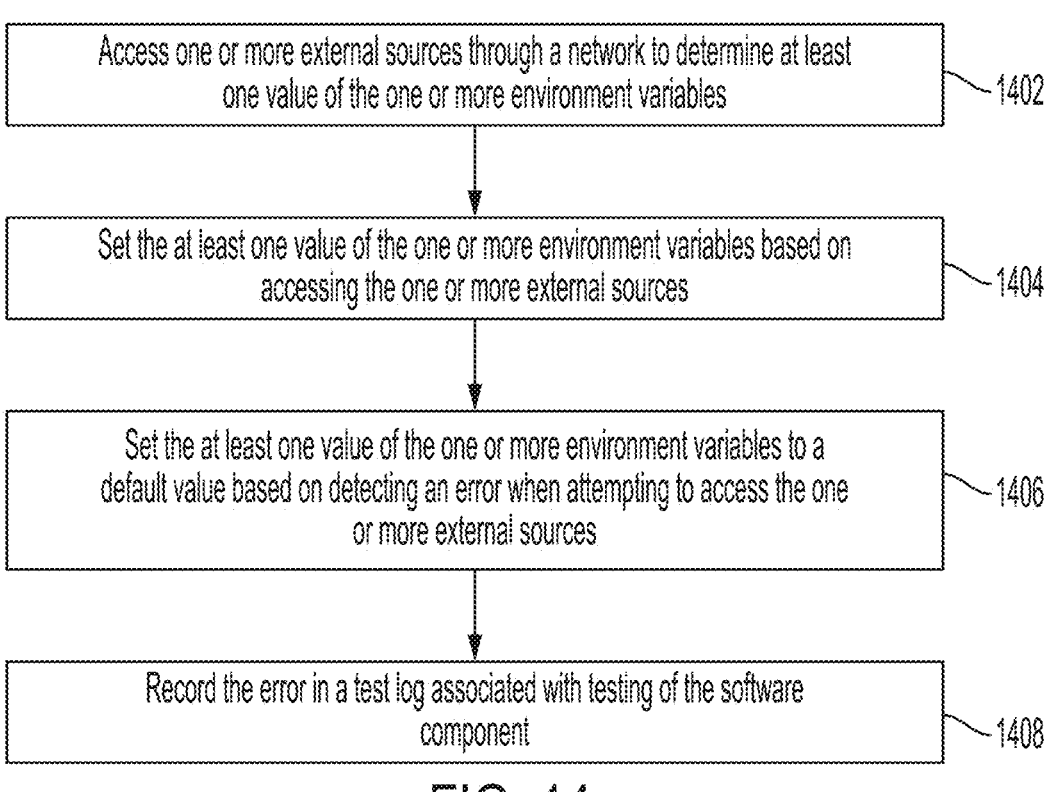

1400

Access one or more external sources through a network to determine at least one value of the one or more environment variables ⌐1402

Set the at least one value of the one or more environment variables based on accessing the one or more external sources ⌐1404

Set the at least one value of the one or more environment variables to a default value based on detecting an error when attempting to access the one or more external sources ⌐1406

Record the error in a test log associated with testing of the software component ⌐1408

FIG. 14

1500

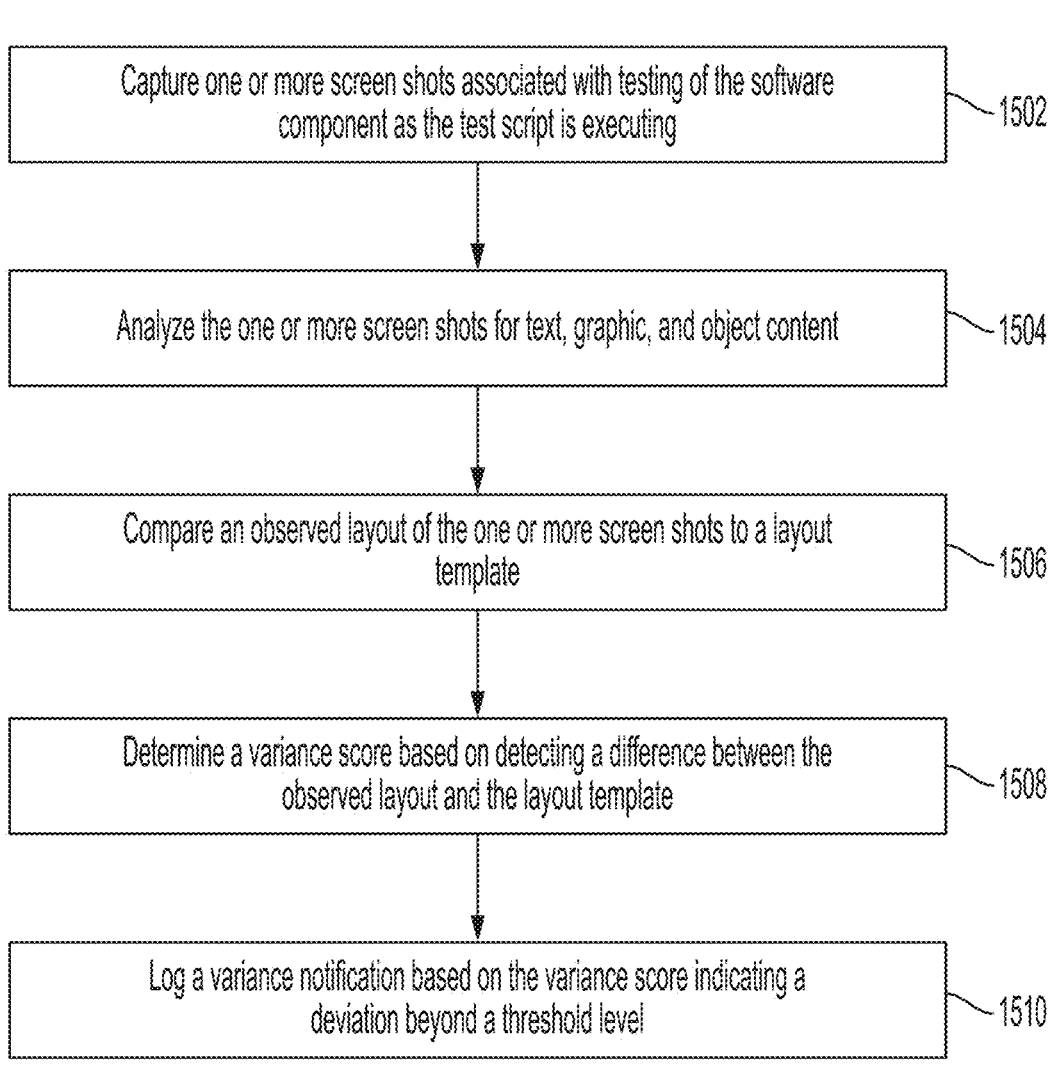

Capture one or more screen shots associated with testing of the software component as the test script is executing —— 1502

Analyze the one or more screen shots for text, graphic, and object content —— 1504

Compare an observed layout of the one or more screen shots to a layout template —— 1506

Determine a variance score based on detecting a difference between the observed layout and the layout template —— 1508

Log a variance notification based on the variance score indicating a deviation beyond a threshold level —— 1510

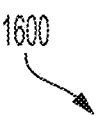

Execute the test script on demand in response to a start command received through a user interface ~ 1602

Pause the test script during execution of the test script in response to a pause command received through the user interface ~ 1604

Edit at least one of the one or more environment variables through the user interface ~ 1606

Display contents of the test script in response to a view script command received through the user interface ~ 1608

Set the scheduled frequency for executing the test script through the user interface ~ 1610

Set a number of retries of executing the test script before declaring a failure, wherein the failure comprises the target condition ~ 1612

FIG. 16

ACTIVE ANALYTICS

BACKGROUND

In the process of developing executable software components, multiple systems and environments can be involved. Software components (also referred to as "components") can include applications, web pages, and other such content executable by a computer system. Software components can be deployed in a range of environments, such as secure environments, where limited access is provided to a select group of users, or cloud environments that may support wider-scale deployment with publicly available content. Testing of components can be performed prior to making the components available. Some components may have dependencies on data sources and/or other components. As such, a component that was previously functional may experience issues where linked components or data sources change or access/connectivity events occur. Accordingly, it can be challenging to verify that software components continue to operate as intended after the software components are deployed.

Some aspects of software component performance relate to service level objectives, where responsiveness and other performance indicators are expected to be within a predetermined range during operation to meet the service level objectives. Performance indicators can change due to factors beyond the control of software component developers, such as availability of computing/cloud resources. Monitoring for performance after deployment and verifying that system security is maintained can be challenging particularly where third-party data feeds are used by the software components. Traditional testing approaches may consider whether a system is up or down and have a limited ability to understand whether service level objectives or other such objectives are being met over a period of time.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

FIG. 13 depicts a process flow according to some embodiments of the present invention;

FIG. 14 depicts a process flow according to some embodiments of the present invention;

FIG. 15 depicts a process flow according to some embodiments of the present invention; and FIG. 16 depicts a process flow according to some embodiments of the present invention.

DETAILED DESCRIPTION

Figure 1:
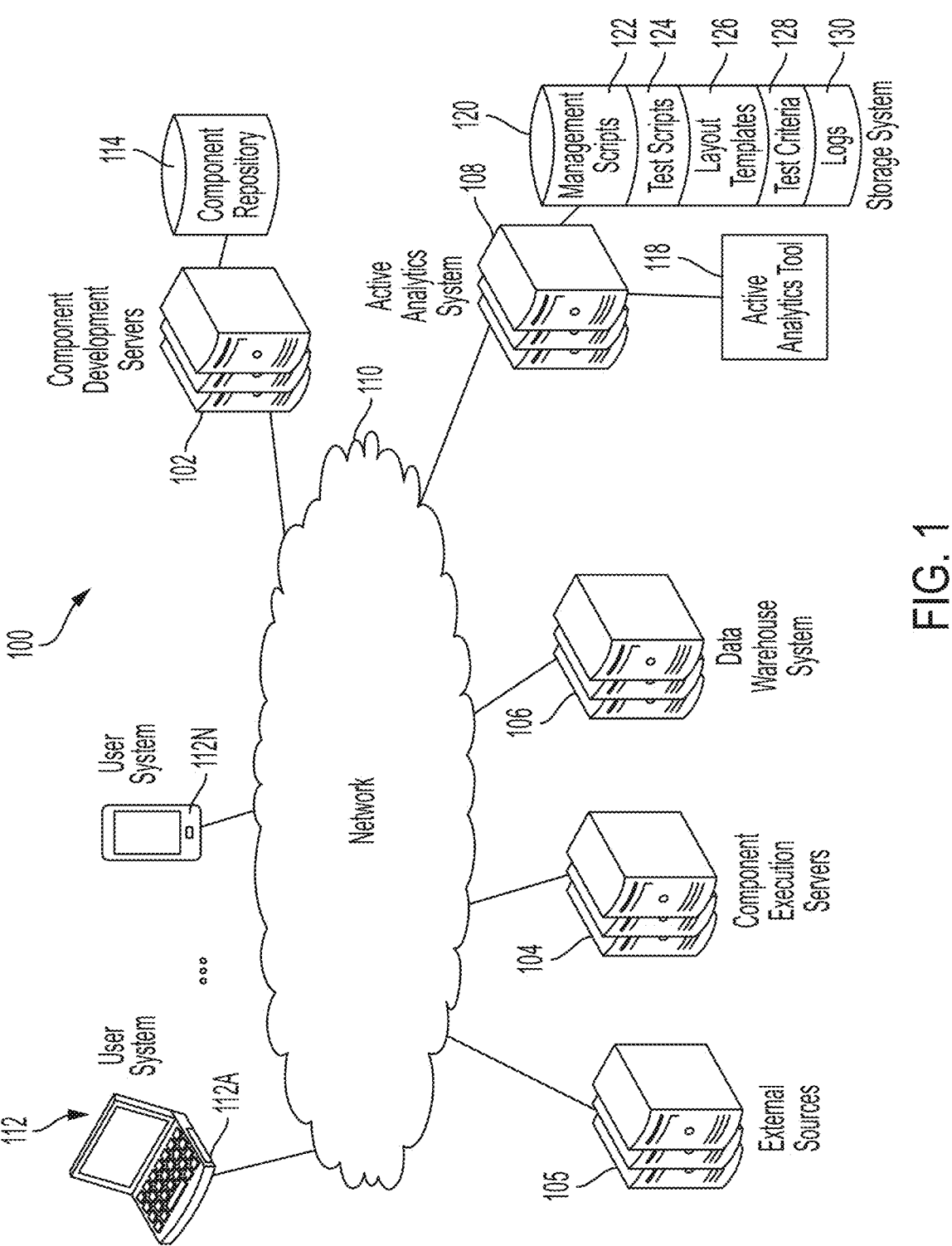
FIG. 1 depicts a block diagram of a system according to some embodiments of the present invention.

According to an embodiment, a system for active analytics is provided. The system can improve computer system performance by supporting testing of software components prior to deployment and after deployment to ensure that security and other aspects are met. Performance monitoring provided by active analytics can support multiple script languages, security models, levels of failures, and notifications. Rather than simply providing a pass/fail indicator, embodiments provide a range of testing and reporting options. Further, test scripts can be reused with environment variables set and changed to test multiple scenarios and/or rapidly generate test cases based on similar configurations. The use of higher-level management scripts can configure a sequence of test cases beyond single test script execution. Further, multiple tests can be executed at the same time to monitor for load effects, interactions, and/or resource contention issues. Reporting can include providing a range of warnings and/or alerts to one or more selected recipients using one or more selected reporting channels.

The system may also enhance security through security vault integration. Using a framework, as further described herein, users and/or system owners can manage the security of required credentials for system access, allow differing levels of scripts to be run in a pipeline targeting specific functionality, and produce reports and/or metrics defined by weighted scoring. The framework can provide for the management and measurement of execution of test scripts, such as synthetic user scripts, to test and simulate interactions with software components. The system supports a modular capability, where the scripts can be triggered for specific functionality as part of automated testing, manage script variability, such as user credentials and triggered inputs, and store variables and credentials using secure vault technology.

Rather than only validating component availability, embodiments can assess multiple performance factors of software components. Examples of performance factors can include specific performance objectives and associated service level indicators, among other factors. Additionally, various layout aspects, such as web page content, can be monitored, as well as the associated processing and system security for interactions with the web page content. Monitoring performed while executing test scripts can include interrogation of responses and system execution to ensure execution is optimized for performance and third-party data feeds. Utilizing active analytics during component development as a system for managing script performance can provide a more robust user-focused measure of system changes during the software development lifecycle. Traditional unit testing typically focuses on a specific unit of code that has changed. In contrast, embodiments may employ test scripts that synthesize user interactions, which can be executed and monitored by the active analytics system to allow a development team to better understand how a change may impact an end user experience.

In embodiments, the system can manage scripts for specific functions and a range of executed functions. Active analytics can include a script modularization capability that provides a single point of configuration for development teams to choose the conditions in which a script will execute in a target environment. For example, a specific script to handle logging-in may measure the impact of an authentication change to validate the change in a development environment. However, a full regression script may be run and measured criteria passed in order to move code from a development environment to a production environment. Active analytics can provide both warehousing and selective execution capability. Thus, the system provides multiple improvements to computer technology and practical applications which can improve existing system performance along with the future performance of software components under development.

Turning now to FIG. 1, a system 100 is depicted upon which active analytics may be implemented. The system 100 includes a plurality of server systems, such as one or more component development servers 102, one or more component execution servers 104, a data warehouse system 106, and an active analytics system 108 coupled to a network 110. A plurality of user systems 112 can access content and/or interfaces through the network 110. For example, user system 112A may be configured as a developer system operable to interface with the component development servers 102, while user system 112N may be configured as an analyst system operable to interface directly with the active analytics system 108 and access other elements of the system 100 indirectly, such as the component development servers 102, component execution servers 104, and data warehouse system 106. Data feeds for some components may be sourced from third parties through external sources 105, which may be accessible through the network 110.

In the example of FIG. 1, the component development servers 102 are operable to develop software components through one or more code files for subsequent execution on the component execution servers 104. Various records associated with component development, execution, and/or problems can be collected and stored in the data warehouse system 106. The data warehouse system 106 can also include data sources that are produced and consumed during execution of components on the component execution servers 104. For example, the data warehouse system 106 can manage access to files and databases and may be further partitioned to control access to the files and data based on user permissions. During a software development process, code to implement components can be developed on the component development servers 102 and stored in component repository 114. The component repository 114 can include check-in/check-out version management control of component files.

An active analytics tool 118 of the active analytics system 108 can execute one or more test scripts 124 from a storage system 120 to test one or more components of the component repository 114. Component testing can be performed prior to release of a component to the component execution servers 104. Alternatively, after a component is deployed for execution by the component execution servers 104, the active analytics tool 118 can be used to run one or more test scripts 124 that test aspects of the component, for example, to confirm that service level performance is maintained and/or linked content continues to function as expected. The active analytics tool 118 can use one or more management scripts 122 to configure test aspects, such as setting environment variables, setting a frequency of execution of the test scripts 124, identifying layout templates 126 to confirm display aspects, identifying test criteria 128, and managing other such aspects. Test results can be stored in logs 130 as a test execution summary and used to trigger alert notifications, such as transmitting alerts to one or more targeted users of the user systems 112. In the example of FIG. 1, the management scripts 122, test scripts 124, layout templates 126, test criteria 128, and logs 130 are depicted as being stored in the storage system 120. However, it will be understood that one or more of the management scripts 122, test scripts 124, layout templates 126, test criteria 128, and/or logs 130 can be distributed elsewhere within the system 100. For instance, the storage system 120 can be implemented as a storage managed within an enterprise or distributed in whole or in part within a cloud environment. The active analytics tool 118 can generate user interfaces for display and to support configuration by users of the user systems 112 having corresponding permissions.

In the example of FIG. 1, each of the component development servers 102, component execution servers 104, data warehouse system 106, active analytics system 108, and user systems 112 can include a processor (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100, such as elements of the component development servers 102, component execution servers 104, data warehouse system 106, active analytics system 108, and/or user systems 112. Although depicted separately, one or more of the component development servers 102, component execution servers 104, data warehouse system 106, active analytics system 108, and/or user systems 112 can be combined or further subdivided.

The user systems 112 may each be implemented using a computer executing one or more computer programs for carrying out processes described herein. In one embodiment, the user systems 112 may each comprise a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 112 are operated by users having the role of a system architect, a software developer, an analyst, or a non-developer (e.g., a manager or administrator) with respect to an application development and troubleshooting process, and the role designations may change.

Each of the component development servers 102, component execution servers 104, data warehouse system 106, active analytics system 108, and user systems 112 can include a local data storage device, such as a memory device. A memory device, also referred to herein as "computer-readable memory" (e.g., non-transitory memory devices, as opposed to transmission devices or media), may generally store program instructions, code, and/or modules that, when executed by a processing device, cause a particular machine to function in accordance with one or more embodiments described herein.

The network 110 can include any type of computer communication technology within the system 100 and can extend beyond the system 100 as depicted. Examples include a wide area network (WAN), a local area network (LAN), a global network (e.g., Internet), a virtual private network (VPN), and an intranet. Communication within the network 110 may be implemented using a wired network, an optical network, a wireless network, and/or any kind of physical network implementation known in the art. The network 110 can be further subdivided into multiple sub-networks that may provide different levels of accessibility or prevent access to some elements of the system 100. For example, some users of user systems 112 may have limited (e.g., read-only) access to the data warehouse system 106, component repository 114, and/or the storage system 120.

Figure 2:
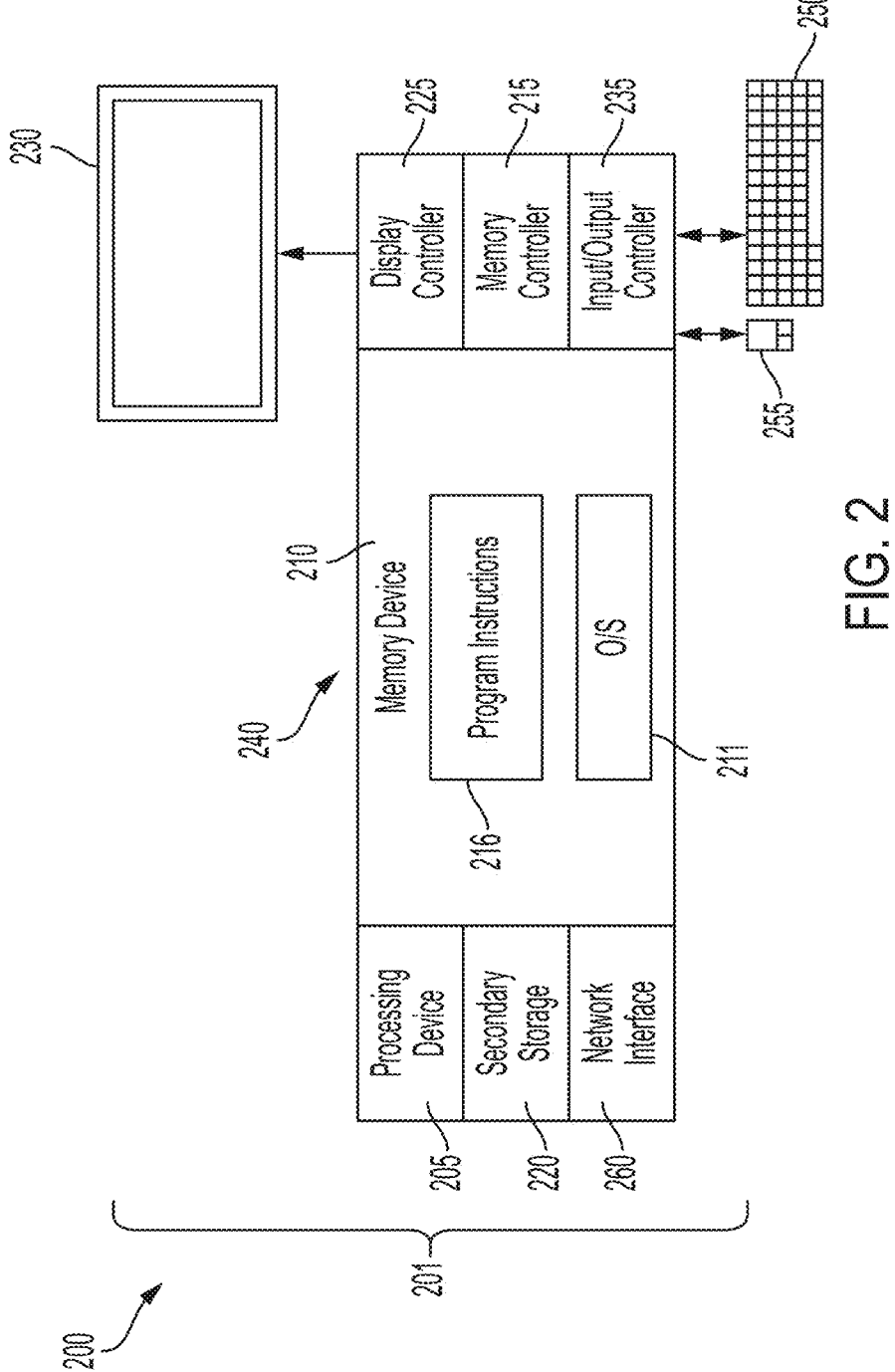
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the component development servers 102, component execution servers 104, external sources 105, data warehouse system 106, active analytics system 108, and/or user systems 112 of FIG. 1.

In an exemplary embodiment, in terms of hardware architecture, as shown in FIG. 2, the computer 201 includes a processing device 205 and a memory device 210 coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), or the like, etc.). Secondary storage 220 can include any one or combination of tape, compact disk read only memory (CD-ROM), flash drive, disk, hard disk drive, diskette, cartridge, cassette or the like, etc. Moreover, the memory device 210 and/or secondary storage 220 may incorporate electronic, magnetic, optical, and/or other types of storage media. Accordingly, the memory device 210 and/or secondary storage 220 are examples of a tangible computer readable storage medium 240 upon which instructions executable by the processing device 205 may be embodied as a computer program product. The memory device 210 and/or secondary storage 220 can have a distributed architecture, where various components are situated remotely from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (O/S) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the processes as further described herein.

The computer 201 of FIG. 2 also includes a network interface 260 that can establish communication channels with one or more other computer systems via one or more network links of the network 110 of FIG. 1. The network interface 260 can support wired and/or wireless communication protocols known in the art.

Figure 3:
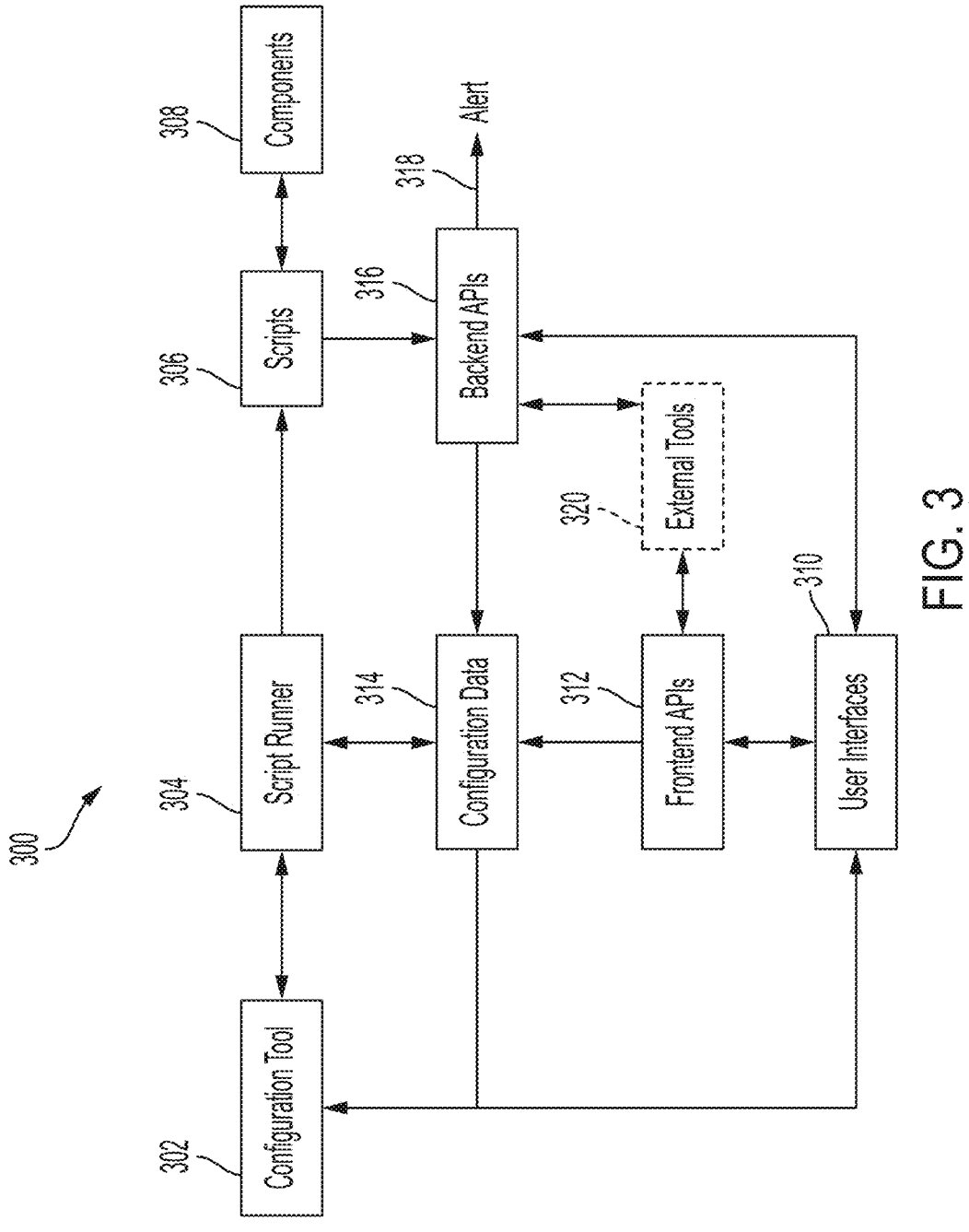
FIG. 3 depicts a block diagram of a framework for active analytics according to some embodiments of the present invention.

FIG. 3 depicts an example of a block diagram of a framework 300 for active analytics according to an embodiment and is described in reference to FIGS. 1-3. In embodiments, the active analytics tool 118 of FIG. 1 can include one or more elements of the framework 300 or may have access to one or more elements of the framework 300. In the example of FIG. 3, the framework 300 can include a configuration tool 302, a script runner 304, and scripts 306 to test one or more components 308. The framework 300 can also include user interfaces 310, frontend application programming interfaces (APIs) 312, configuration data 314, and backend APIs 316. Although the example of FIG. 3 depicts a specific configuration and directional flows, it will be understood that elements of the framework 300 may be combined, modified, or further subdivided.

The user interfaces 310 can be accessible through the user systems 112 of FIG. 1 with various levels of access provided, depending upon the permissions of the user. The user interfaces 310 can be used to set up script execution parameters and/or view script execution results. For example, the user interfaces 310 can include a configuration interface that sets values of the configuration data 314 through the frontend APIs 312 for use by the configuration tool 302. The user interfaces 310 can also access the configuration tool 302 to view current settings and/or modify settings. The user interfaces 310 can also include a scheduling interface that may establish when the configuration tool 302 should invoke the script runner 304 to execute one or more scripts 306 as configured through the configuration data 314. The script runner 304 can support multiple script languages, such that the scripts 306 can be written in one or more scripting languages and may support sequencing of scripts 306 in two or more different scripting languages. The user interfaces 310 can also monitor results through a results dashboard that displays results of executing the scripts 306 after result processing is performed by the backend APIs 316. The backend APIs 316 can update values of the configuration data 314, such that results of executing the scripts 306 can be used to modify configuration conditions in subsequent execution of the scripts 306. Thus, more complex behaviors can be tested through feedback loops and conditional inputs. The backend APIs 316 can also include condition monitors to trigger one or more alerts 318 when one or more conditions are met.

Example functions of the frontend APIs 312 can include setting scheduling and configuration values, as well as getting configuration and scripts 306 to be executed next in a sequence. The frontend APIs 312 can also access execution results, for example, to review previous results captured in the logs 130 of FIG. 1. Example functions of the backend APIs 316 can include capturing execution status of the scripts 306, such as start conditions, stop conditions, and any errors or warning conditions. The backend APIs 316 may also perform screen captures to compare layout performance to layout templates 126 of FIG. 1. The backend APIs 316 can also perform monitoring to compare the response of the components 308 to the test criteria 128 associated with the test scripts 124 or the management scripts 122 of FIG. 1 as the scripts 306. The backend APIs 316 may also support storing results to the logs 130 of FIG. 1 and fetching supplemental values from other sources, such as the external sources 105 of FIG. 1, for comparisons or making updates to the configuration data 314. The backend APIs 316 may also interface with other monitoring tools to determine the effects of executing the scripts 306 on the components 308. The configuration data 314 can include information such as execution parameters, environment variables, log conditions, thresholds, and other such values.

External tools 320 can interface with various elements of the framework 300, such as the frontend APIs 312 and backend APIs 316. For example, external tools 320 can use the frontend APIs 312 to configure tests and trigger test execution. The external tools 320 can access the backend APIs 316 to set trigger conditions for the alert 318, to access test results, and verify that performance goals are achieved before allowing deployment of new or updated versions of the components 308. Thus, the frontend APIs 312 and backend APIs 316 can support both direct user interactions through user interfaces 310 and/or automated interactions through the external tools 320.

Figure 4:
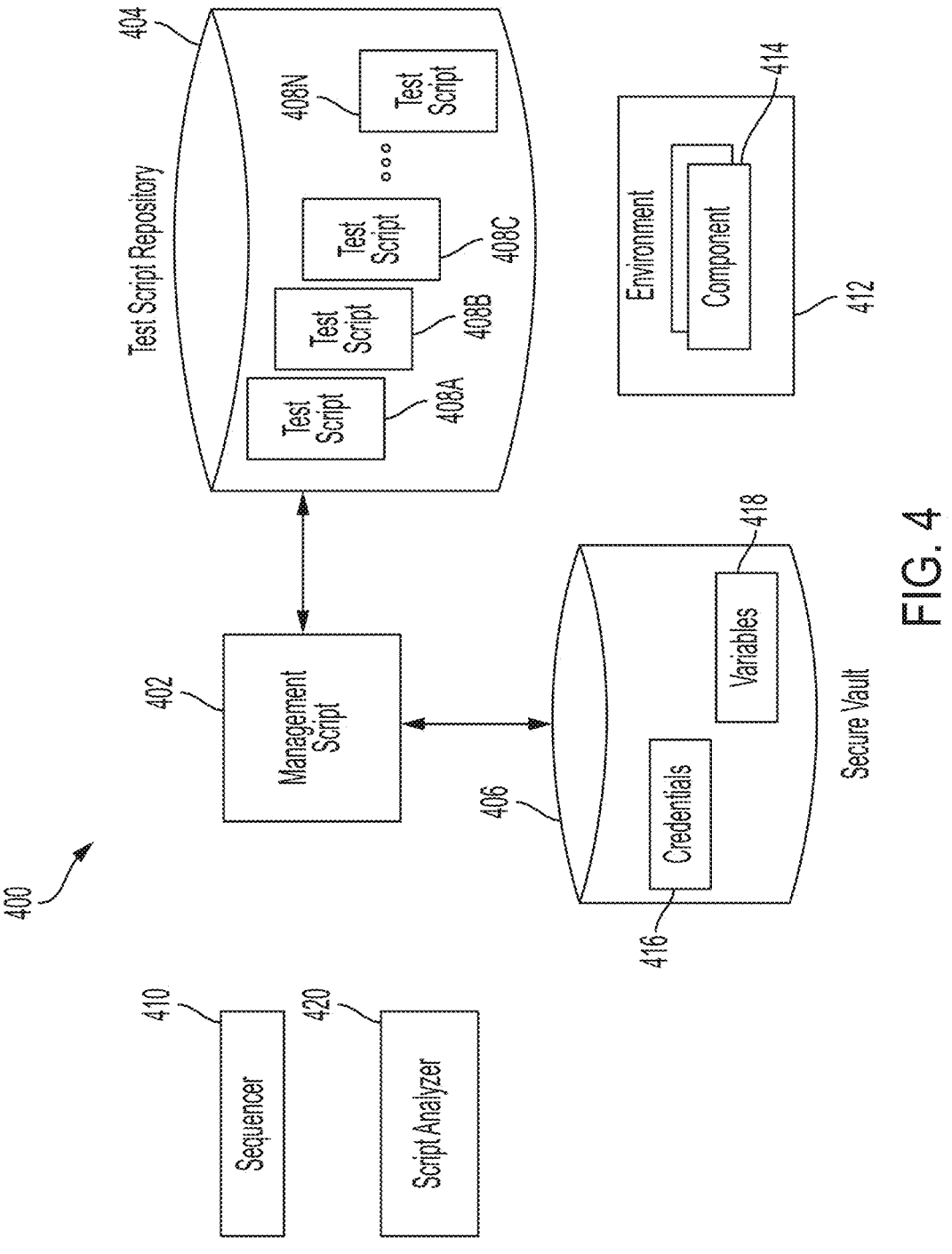
FIG. 4 depicts a block diagram of a test configuration according to some embodiments of the present invention.

FIG. 4 depicts a block diagram of a test configuration 400 according to some embodiments. In the example of FIG. 4, a management script 402 can interface with a test script repository 404 and a secure vault 406. The test script repository 404 can store a plurality of test scripts 408A-408N. The management script 402 is an example of one of the management scripts 122 of FIG. 1 and the test scripts 408A-408N are examples of the test scripts 124 of FIG. 1. A sequencer 410 of the active analytics tool 118 of FIG. 1 can be used to configure the management script 402 to determine which of the test scripts 408A-408N should be performed in a particular order. For example, the sequencer 410 may have a user interface accessible through the user systems 112 of FIG. 1 to allow a user to select a script execution flow for the management script 402. For instance, test script 408A may comprise a login script, test script 408B may be directed to testing a display layout under a first set of conditions, and test script 408C may be directed to testing the display layout under a second set of conditions. To establish an environment 412 for testing a component 414, the management script 402 may access credentials 416 and variables 418 of the secure vault 406 as part of configuring and executing one or more of the test scripts 408A-408N. The secure vault 406 can use encryption and additional layers of security beyond that of the test script repository 404. The component 414 can be one of the components 308 of FIG. 3, which can be extracted from the component repository 114 of FIG. 1 or accessed after deployment, for instance, on component execution servers 104 of FIG. 1. Further, the environment 412 can include multiple components 414, and tests of the test scripts 408A-408N can interact with multiple components 414, as well as test interactions between components 414.

Upon execution of the management script 402, the credentials 416 and variables 418 can be accessed to configure the environment 412 for the component 414 to align with one or more of the test scripts 408A-408N used to test the component 414. For example, the management script 402 may use the credentials 416 to configure the environment 412 in a valid state to test the component 414 under normal expected operating conditions by a test script 408 and test for an error condition by using a modified version of the credentials 416 to ensure that the component 414 detects and handles invalid credentials according to the test criteria 128 of FIG. 1. Securely storing the credentials 416 and variables 418 separately from the test scripts 408A-408N of the test script repository 404 can allow the test scripts 408A-408N to be copied and reused to test other components without exposing details of the credentials 416 and/or variables 418.

The test configuration 400 may also include a script analyzer 420 that can assist the management script 402 in determining whether the test scripts 408A-408N rely upon any environment variables for operation. For example, when the sequencer 410 adds one of the test scripts 408A-408N to a planned test execution sequence, the script analyzer 420 can be invoked to analyze the newly added test script 408 to determine whether one or more environment variables are used by the test script 408. The script analyzer 420 can prompt the user to select a value for the environment variable to support the test or to use a default value. The selected value can then be stored in the variables 418. When the management script 402 runs, the values of the variables 418 can then be extracted from the secure vault 406 and used to configure the environment 412 to support test cases for the test script 408 associated with the corresponding test of the component 414. The script analyzer 420 can comprise part of the active analytics tool 118 and/or can be combined with the sequencer 410.

The test script repository 404 and the secure vault 406 can comprise part of the storage system 120 of FIG. 1 or may be implemented elsewhere within the system 100 of FIG. 1. Although depicted separately, in some embodiments, the test script repository 404 and the secure vault 406 may be combined, for example, where a higher level of security is desired for the test scripts 408A-408N.

Figure 5:
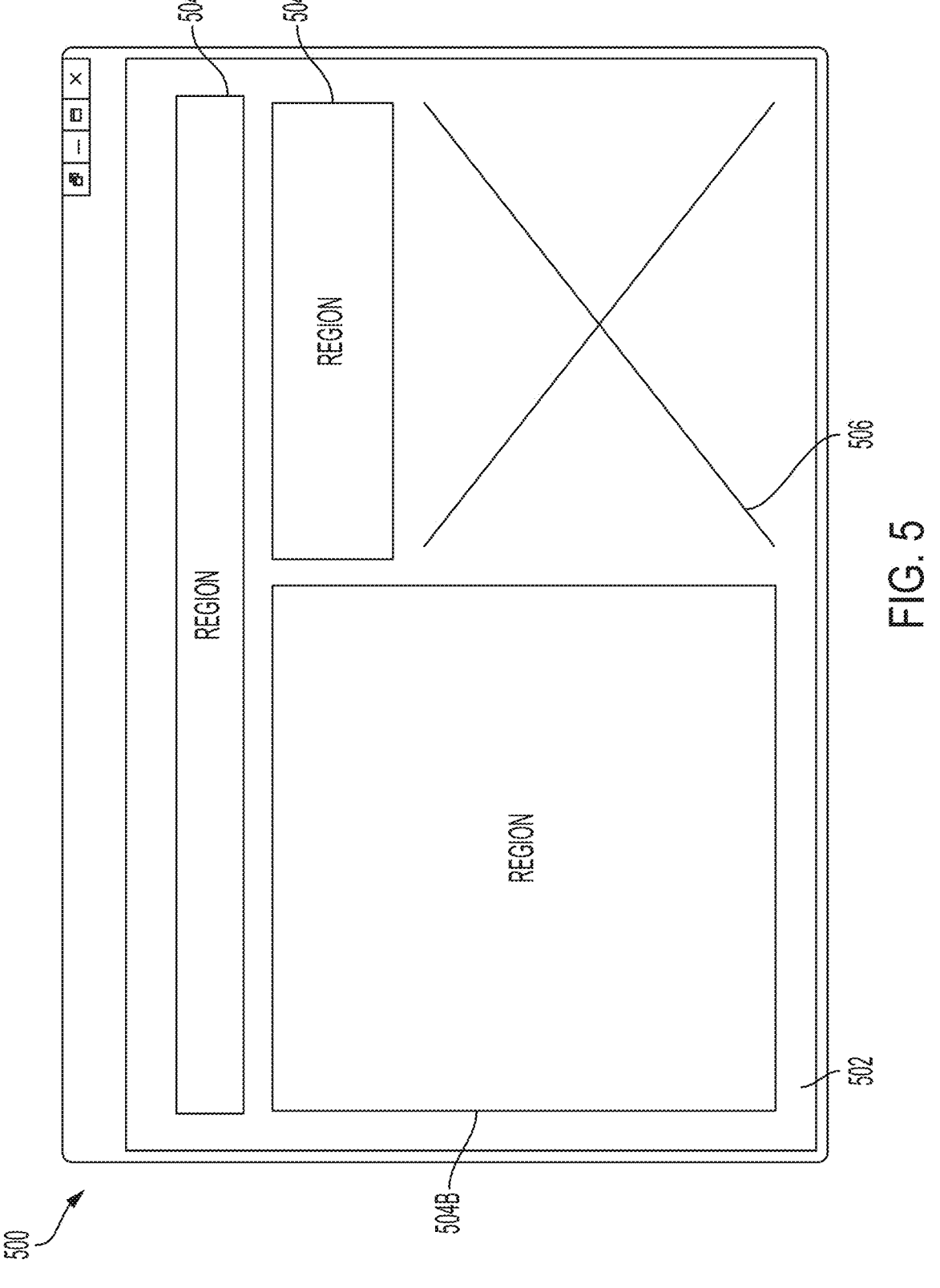
FIG. 5 depicts a layout template according to some embodiments of the present invention.

FIG. 5 depicts a layout template 500 according to some embodiments. The layout template 500 is a visual example of one of the layout templates 126 of FIG. 1. The layout template 500 may define a display region 502 that can be displayed by the component 414 of FIG. 4. For example, the component 414 can comprise an application or a webpage that may be viewed through another application, such as a web browser. Within the display region 502, there can be multiple regions defined at targeted locations. For instance, region 504A can comprise a header or banner location, region 504B can comprise a left side full panel location, and region 504C can comprise a right side partial panel location. The layout template 500 can also include one or more undefined regions 506, where the content at a location of an undefined region 506 does not impact the test results. For the regions 504A-504C, the content can be defined as a particular graphic, an embedded object, text, or a link to other content, such as the external sources 105. Testing can include verifying that all of the content of regions 504A-504C is placed at the target locations. The regions 504A-504C can be defined through variable dimensions that scale with resizing of the display region 502. For instance, locations can be defined in terms of relative ratios to support various levels of display sizing. Although the example of FIG. 5 appears as panels on a static display configuration, the layout template 500 can be defined as a larger size than can be displayed in a single view to support scrolling and dynamic content. Thus, the region 504A can be expected to be initially displayed but would also be expected to scroll off of the visible portion of the display region 502 as scrolling occurs. Further additional regions for testing may become visible as scrolling occurs. It will be understood that many configuration options are possible with any number of regions defined for testing.

Figure 6:
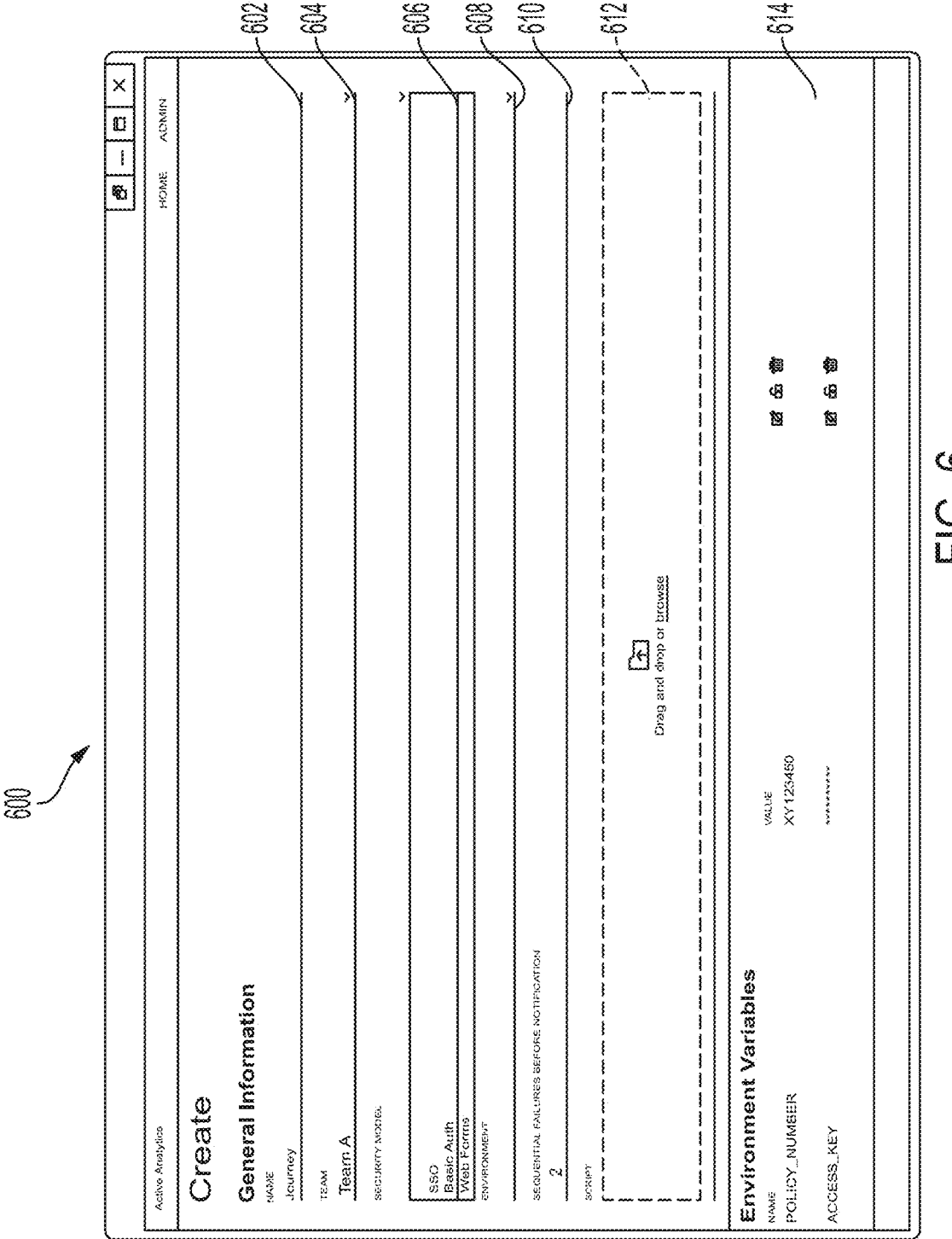
FIG. 6 depicts a user interface according to some embodiments of the present invention.

FIG. 6 depicts a user interface 600 according to some embodiments. The user interface 600 is an example of one of the user interfaces 310 of FIG. 3 for configuring the management script 402 of FIG. 4. The user interface 600 allows general information, such as a name 602 and team 604, to be defined for the management script 402. Other configuration items can include a security model 606, an environment definition 608, a number of retries 610, a script list 612, and environment variables 614. The team 604 can define a group of users with access to edit and/or execute the management script 402. Membership in the group of users associated with team 604 can be used to restrict access for viewing, creating, and/or editing various parameters. The security model 606 can be used in combination with the credentials 416 to establish secure execution of the component 414 of FIG. 4. The security model 606 can be any known in the art, such as Basic Auth, Bearer Tokens, Web Forms, Single Sign On (SSO), and the like. Further, various sub-options of implementation variations can be supported through the security model 606. The environment definition 608 can define whether the component 414 will be tested in a development environment, a production environment, or other such environment. The number of retries 610 can define how many sequential failures are allowed before triggering an alert notification. For example, if the number of retries 610 is 2, then there can be two sequential failures before an alert is generated to cut down on excessive notifications for transient conditions, if desired. The script list 612 can define which of the test scripts 408A-408N of FIG. 4 are being called and can establish a sequence of execution. The selected instances of the test scripts 408A-408N can be executed sequentially, in parallel, or in a mixed combination (e.g., execute a sequence of test scripts 408A and 408B in parallel with test script 408C).

The environment variables 614 can identify the variable names and values used for the management script 402 and can be stored in variables 418 of FIG. 4. The environment variables 614 also illustrate an example where some values may be viewable and others may be secure and hidden. Hidden values for sensitive information may appear masked, for instance, as a string of replacement characters (e.g., "******" or other such masking). The environment variables 614 can be edited, made secure/hidden, and/or deleted from the user interface 600. Values depicted in the user interface 600 can be directly populated, pulled from another source, accessed from a repository, dragged/dropped from another source, or updated in other ways. For instance, values can be populated through the frontend APIs 312 by one or more of the external tools 320 of FIG. 3. It will be understood that the example of FIG. 6** represents an example user interface and other features can be included or features omitted in embodiments.

Figure 7:
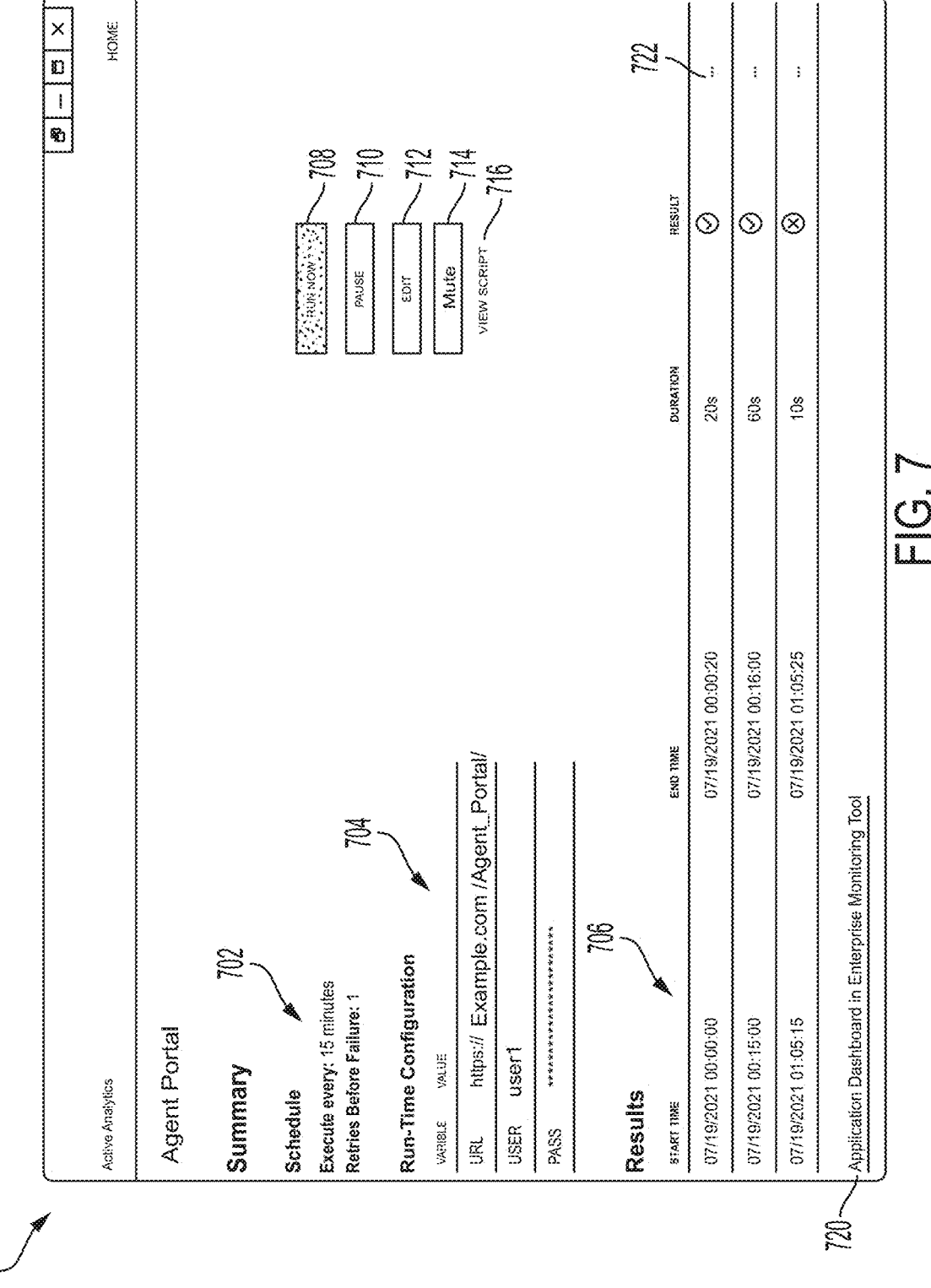
FIG. 7 depicts a user interface according to some embodiments of the present invention.

FIG. 7 depicts a user interface 700 according to some embodiments. In the example of FIG. 7, the user interface 700 depicts a summary of the configuration and results of executing a test script, such as one of the test scripts 408A-408N of FIG. 4. The summary can be associated with a particular script configuration. The summary can include schedule information 702, such as an execution frequency and a number of retries. The summary can also include run-time configuration information 704, such as a username, a password, a security model, and a resource location to execute the test script 408 with user permissions set to match permissions of a user account associated with the username. The summary can also include results 706, such as a start time, an end time, a duration, a result status, and other such information. Various commands can be selectable, such as run now 708, pause 710, edit 712, mute 714, and/or view script 716. Run now 708 can initiate execution of the test script 408 that may otherwise be configured to run at a scheduled execution frequency. Pause 710 can temporarily halt the test script 408 during execution. Edit 712 can support changing operational parameters (e.g., environment variables) used during script execution. Mute 714 can allow the test script 408 to run without triggering an alert notification. View script 716 can open the test script 408 for viewing and/or editing. Further, the user interface 700 can include links to other tools, such as an application dashboard tool link 720. The application dashboard tool link 720 can pass information to another tool or be a targeted link that closely aligns with other data relevant to execution of the script associated with FIG. 7. The results 706 can include further options 722, for instance, to open detailed result logs, for a particular script execution (e.g., as further described in reference to FIG. 11). It will be understood that the example of FIG. 7 represents an example user interface and other features can be included or features omitted in embodiments.

Figure 8:
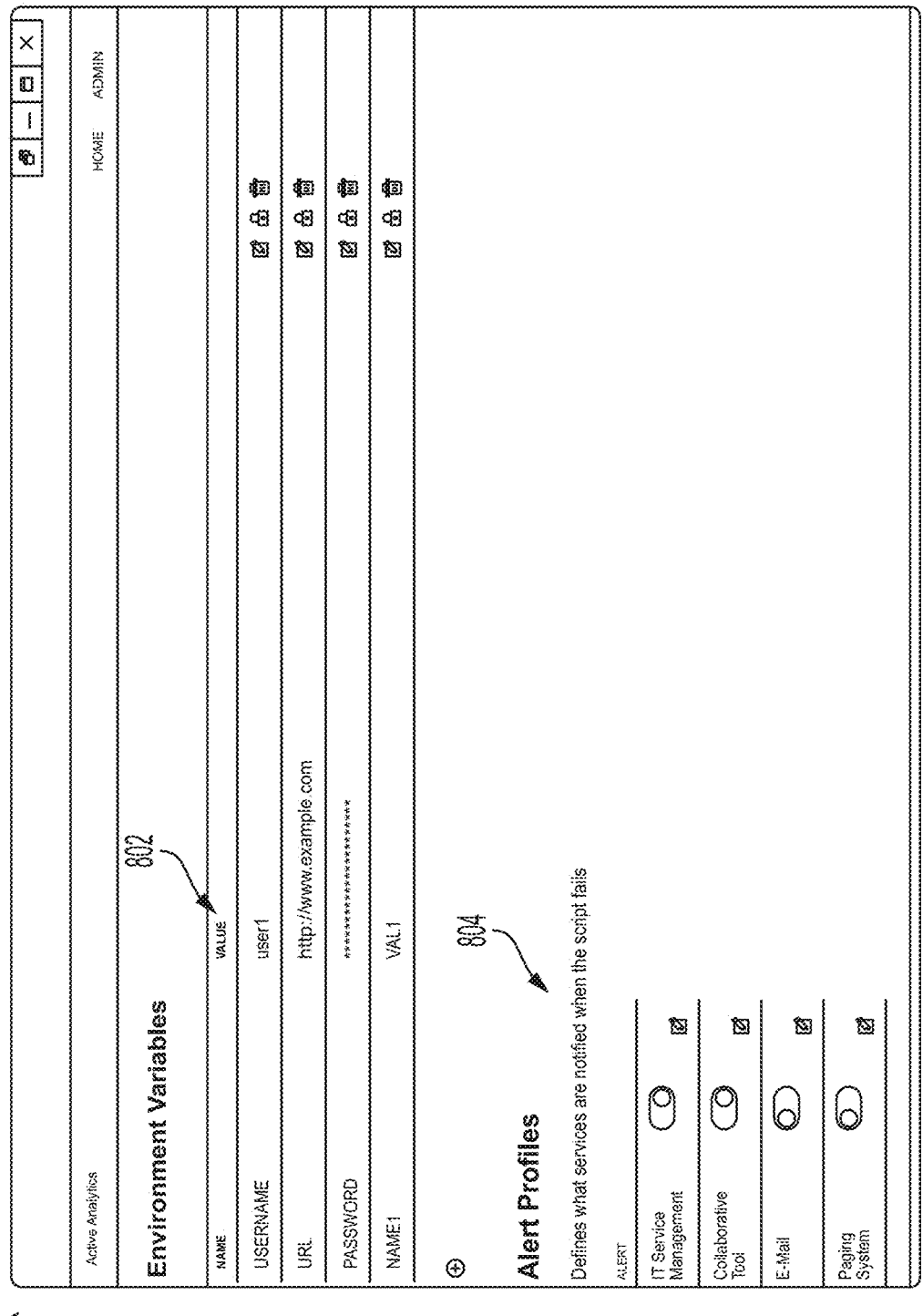
FIG. 8 depicts a user interface according to some embodiments of the present invention.

FIG. 8 depicts a user interface 800 according to some embodiments. In the example of FIG. 8, the user interface 800 depicts a configuration interface associated with executing a test script, such as one of the test scripts 408A-408N of FIG. 4, and a notification selector. Environment variables 802 can identify the variable names and values used for the management script 402 and can be stored in variables 418 of FIG. 4. The environment variables 802 can also store access and security information. The environment variables 802 can be edited, made secure/hidden, and/or deleted from the user interface 800. The user interface 800 can support settings for a single one of the test scripts 408A-408N or a group of test scripts 408A-408N. The user interface 800 can also include an alert profile selector 804. The alert profile selector 804 can identify one or more services to invoke when the associated test scripts 408A-408N fail or meet a notification condition. Examples of services of the alert profile selector 804 can include an IT service management system, a collaborative tool, e-mail, a paging system, and/or other such services. Services can have different types of content and delivery options. For instance, IT service management may trigger an investigation request for an IT group to further analyze the results, while the collaborative tool may open a chat session for a group of users. For each of the services, a default reporting message and distribution group can be defined. Thus, one group of users may be notified via a first service, and another group of users can be notified via a second service. It will be understood that the example of FIG. 8 represents an example user interface and other features can be included or features omitted in embodiments.

Figure 9:
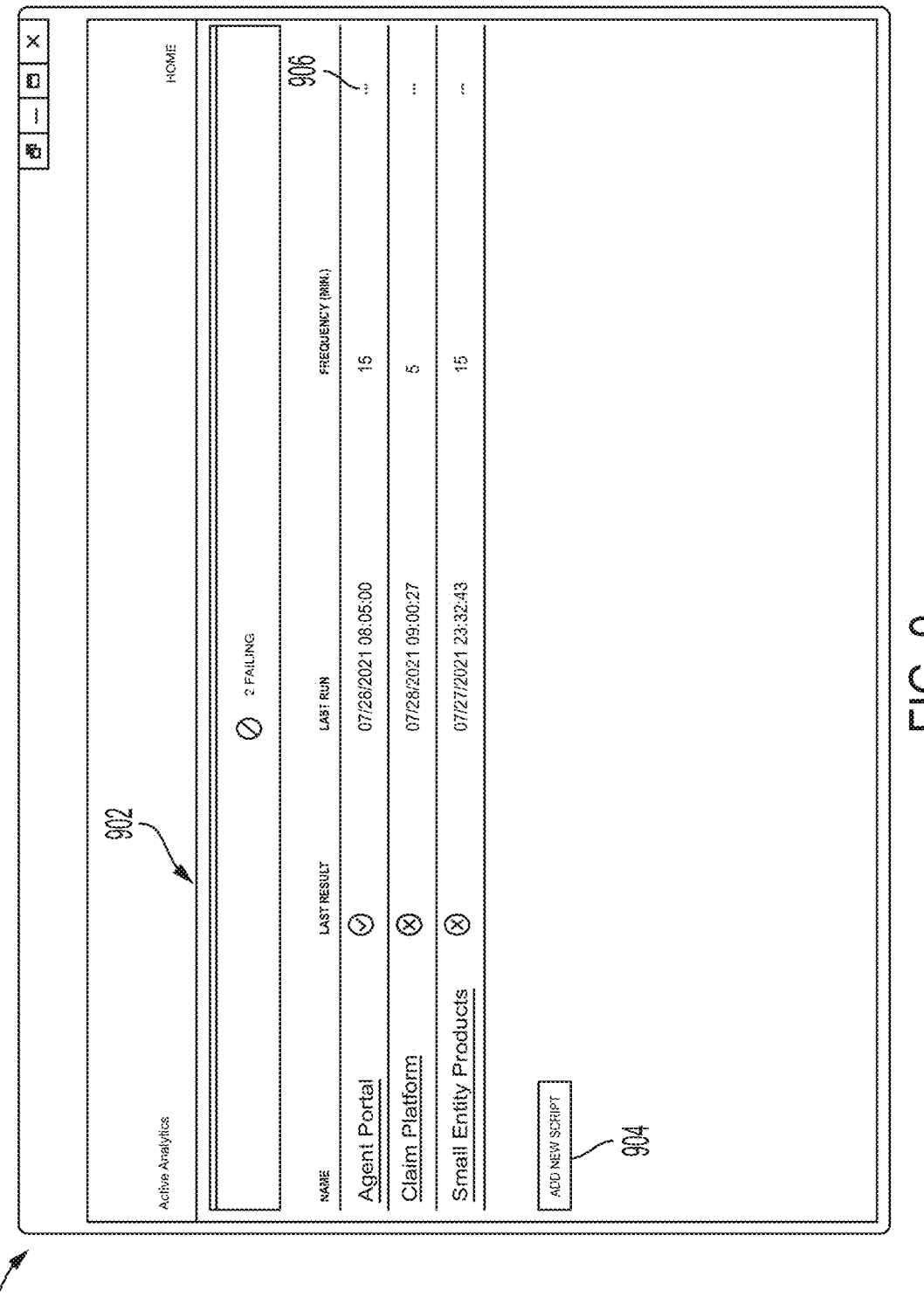
FIG. 9 depicts a user interface according to some embodiments of the present invention.

FIG. 9 depicts a user interface 900 according to some embodiments. In the example of FIG. 9, the user interface 900 depicts a summary of the results 902 of executing multiple test scripts, such as the test scripts 408A-408N of FIG. 4. Viewing of the results 902 through the user interface 900 can be limited based on the permissions of the user and/or team membership. The results 902 can identify the test script, the last result, the time/date of the last execution of the script, a scheduled frequency of execution, and other such information. The last result can comprise a visual indicator of a pass, a failure, and/or warning. A warning may be used to indicate a deviation in performance that is not considered a failure, such as meeting some but not all of the service level objectives. The user interface 900 can also include an option to add a new script 904 to the list of scripts currently being executed. The results 902 can include further options 906, for instance, to open a summary for a particular script (e.g., as previously described in reference to FIG. 7). It will be understood that the example of FIG. 9 represents an example user interface and other features can be included or features omitted in embodiments.

Figure 10:
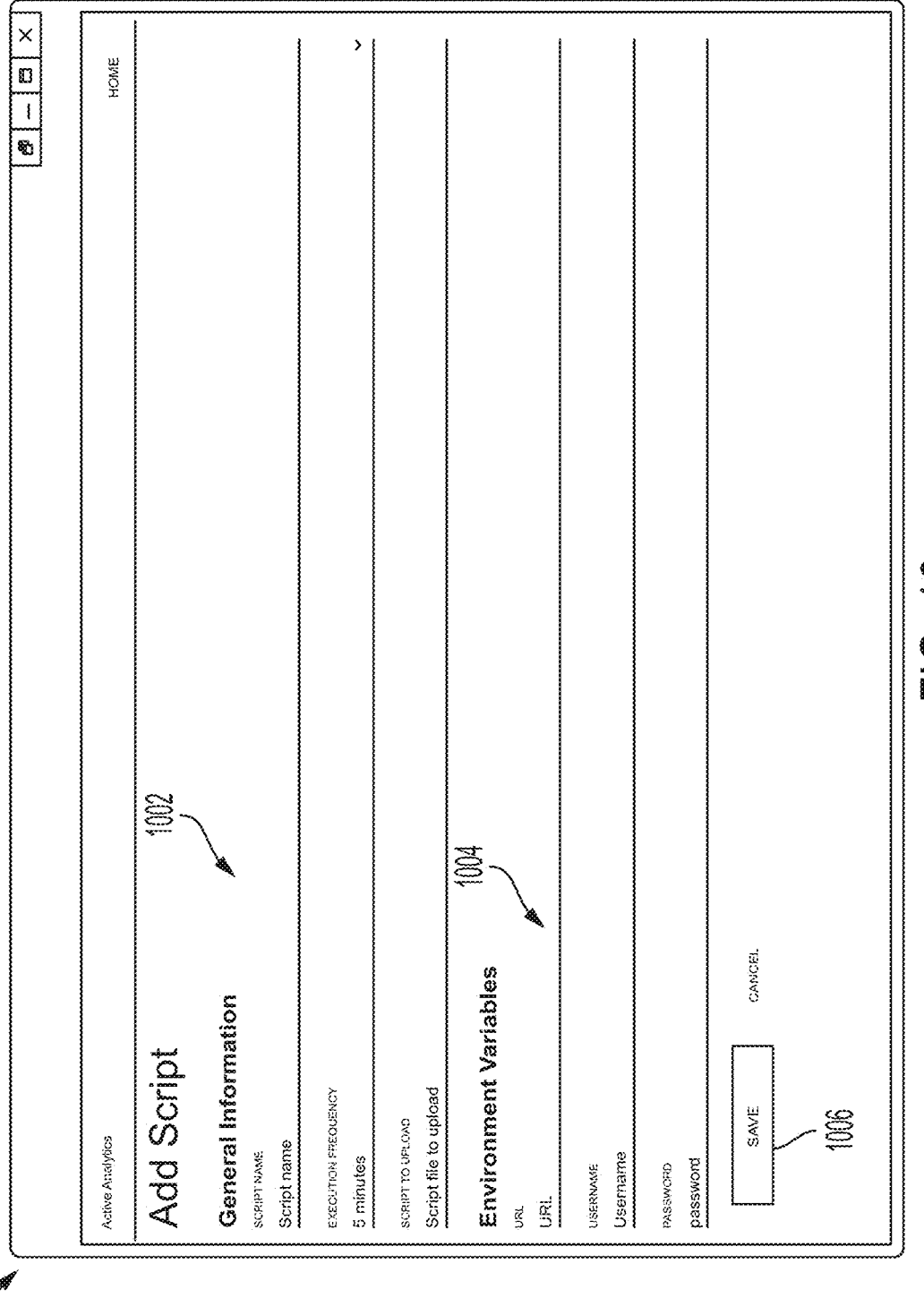
FIG. 10 depicts a user interface according to some embodiments of the present invention.

FIG. 10 depicts a user interface 1000 according to some embodiments. In the example of FIG. 10, the user interface 1000 depicts an option of adding a new script for execution, such as the test scripts 408A-408N of FIG. 4. The user interface 1000 may be invoked when a user selects the option to add a new script 904 of FIG. 9. General script execution information 1002 can include a script name, an execution frequency, and a script file to be uploaded. The uploading of the script file can support linking to an existing test script or adding a new test script to the test script repository 404 of FIG. 4. The user interface 1000 can also include environment variables 1004. The environment variables 1004 can identify information associated with an environment, such as a username, a password, a security model, and a resource location to execute the test script with user permissions set to match permissions of a user account associated with the username. The user interface 1006 can also include command options to support saving or canceling the request to add a script. It will be understood that the example of FIG. 10 represents an example user interface and other features can be included or features omitted in embodiments.

Figure 11:
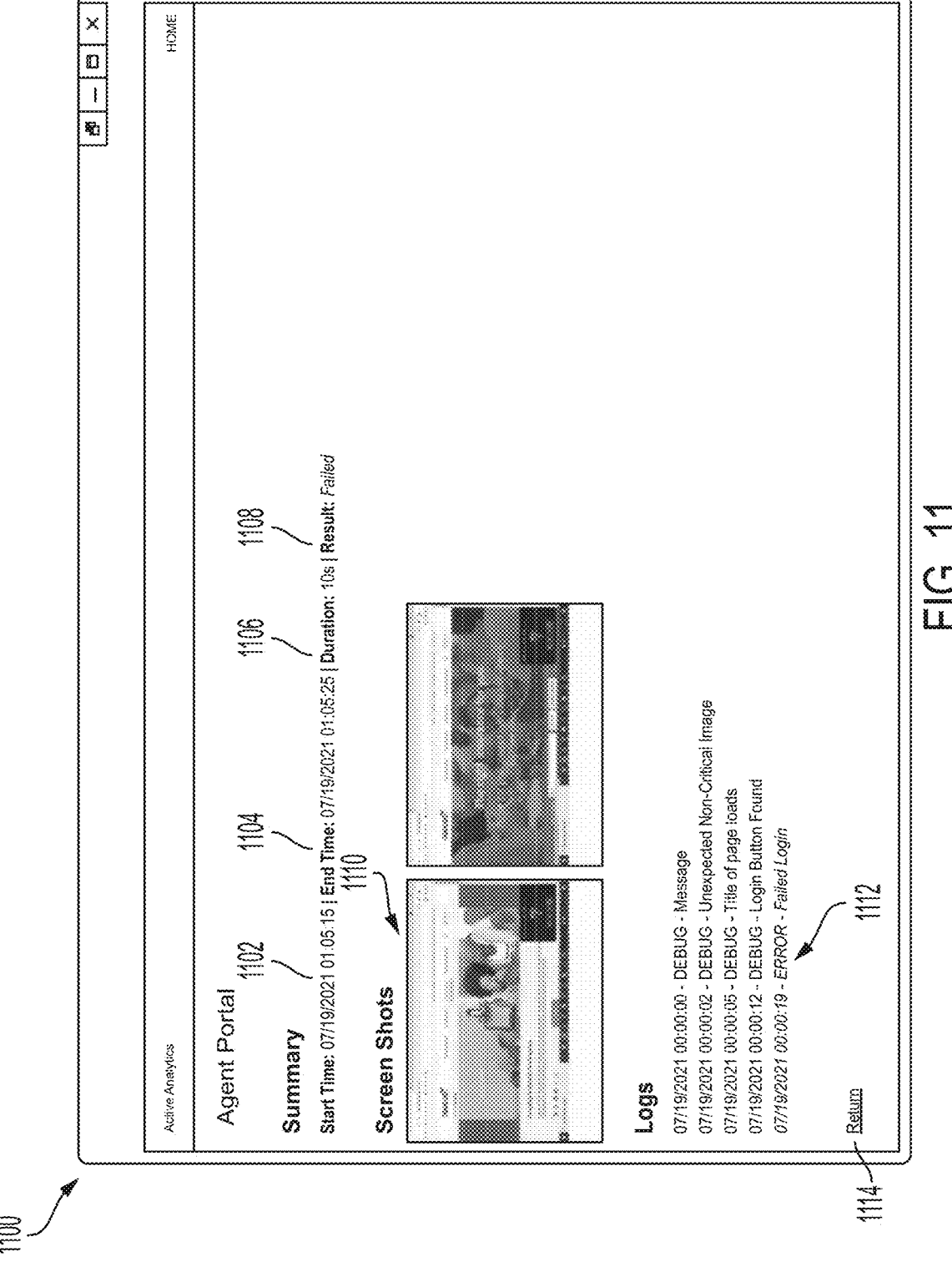
FIG. 11 depicts a user interface according to some embodiments of the present invention.

FIG. 11 depicts a user interface 1100 according to some embodiments. In the example of FIG. 11, the user interface 1100 depicts a test execution summary of a test script, such as one of the test scripts 408A-408N of FIG. 4. Summary information can include, for instance, a start time 1102, an end time 1104, a duration 1106, a result status 1108, and other such information. The summary information may be from a most recent execution of the test script and may halt upon a failure condition. Alternatively, a user may be able to scroll through a list of results and view associated summary information for a selected execution. The user interface 1100 can also depict captured screen shots 1110 collected during execution of the test script. The screen shots 1110 can be used in making comparisons to one or more layout templates 126 of FIG. 1 to detect issues with a display result of a component under test. The screen shots 1110 can also mark differences detected relative to an associated layout template 500 of FIG. 5. For instance, if the difference is detected in region 504C of FIG. 5 in one of the screen shots 1110, a corresponding area of the screen shot that aligns with region 504C may be marked with a visual overlay (e.g., a box or highlighting). Further, detected differences in the screen shots 1110 can be logged with descriptive text to explain a detected mismatch. The user interface 1100 can also display one or more records of a test history log 1112. The test history log 1112 may provide general warnings of detected minor problems (e.g., an unexpected non-critical image) and identify failure conditions that are considered an error, such as a login failure. The test history log 1112 may include links to view additional details about warnings and errors. The user interface 1100 may also include other links 1114 to support navigation to other user interfaces. It will be understood that the example of FIG. 11 represents an example user interface and other features can be included or features omitted in embodiments.

Figure 12:
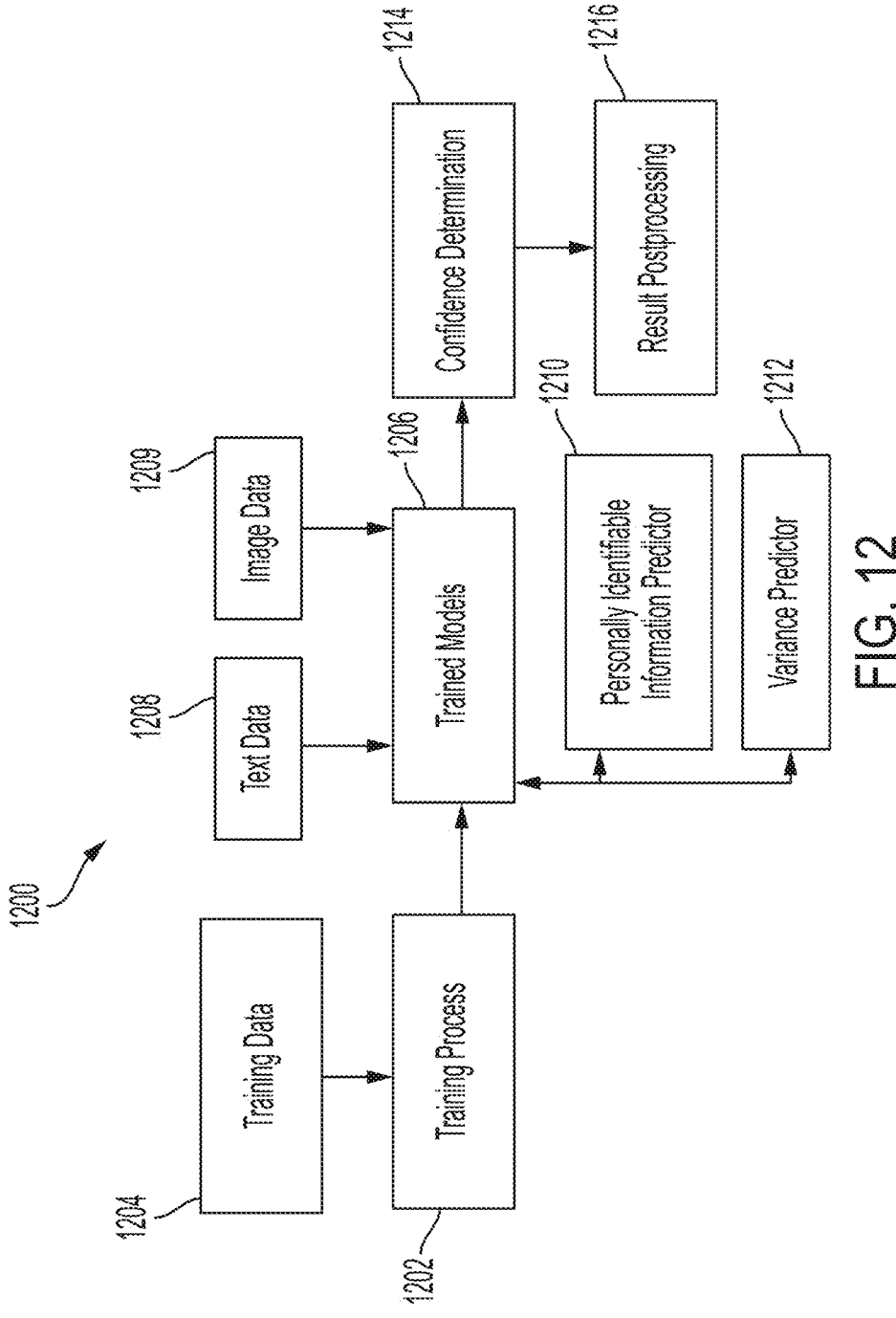
FIG. 12 depicts a training and prediction process according to some embodiments of the present invention.

FIG. 12 depicts a training and prediction process 1200 according to some embodiments. The training and prediction process 1200 can include a training process 1202 that analyzes training data 1204 to develop trained models 1206 for a personally identifiable information (PII) predictor 1210 and a variance predictor 1212. The training process 1202 can use labeled or unlabeled data in the training data 1204 to learn features, such as a mapping of words and phrases to PII and mapping images to image variations. The training data 1204 can include name lists and image content to establish a ground truth for learning coefficients/weights and other such features known in the art of machine learning to develop trained models 1206. Images for training can include intentionally modified images that change the scale, color, orientation, contrast, and other such parameters of baseline training images. The trained models 1206 can include a family of models to identify specific types of features from text data 1208 and/or image data 1209. The text data 1208 can be collected during execution of test scripts 408A-408N that result in a text output of the component 414 of FIG. 4. The image data 1209 can include portions of images extracted from image output of the component 414 of FIG. 4. The trained models 1206 can include the PII predictor 1210 to identify likely PII in text data 1208. The variance predictor 1212 can be used to determine a variance score based on a difference between an observed layout and a layout template, such as layout template 500 of FIG. 5 for image data 1209. Detection of image differences can use any known image processing technique and may pass image data to a separate image processing service to produce summarized results. Other such models and further subdivision of the trained models 1206 can be incorporated in various embodiments.

The trained models 1206 can output a confidence determination 1214 indicating a confidence level of a PII prediction or variance prediction. For example, where a text pattern is detected that maps to a pattern similar to other PII, the confidence determination may be above a threshold as matching a known pattern. Result postprocessing 1216 can determine an action to take based on the confidence level identified by the confidence determination 1214, such as verifying that a security operation is performed on the PII. Result postprocessing 1216 can include determining whether content in one of the regions 504A-504C of FIG. 5 is considered sufficiently similar to the expected content when comparing observed images of a screen shot to the layout template 500 of FIG. 5. Where the image similarity is below a confidence threshold from the confidence determination 1214, an image fault can be declared in the test results. As results are processed and interpreted, the results or user responses to the results can be used as feedback to adjust the confidence determination 1214 or trigger retraining. For example, where tests incorrectly fail, the results can be used to add to the training data 1204 to periodically retrain the trained models 1206 with higher quality examples. Different image processing effects can be overlayed depending on the confidence level. For instance, a lower confidence difference that exceeds a minimum threshold can have a different image effect overlay than a higher confidence difference that also exceeds the minimum threshold (e.g., a thinner border around the difference area that expands to a thicker border with higher confidence). It will be understood that the training and prediction process 1200 can be performed by any portion of the system 100 of FIG. 1 and/or may be performed by another server (not depicted) which may be accessible by the system 100.

Turning now to FIG. 13, a process flow 1300 is depicted according to an embodiment. The process flow 1300 includes a number of steps that may be performed in the depicted sequence or in an alternate sequence. The process flow 1300 may be performed by the system 100 of FIG. 1. The process flow 1300 is described in reference to FIGS. 1-13 and can be performed by the active analytics tool 118 of FIG. 1 in combination with other tools.

At block 1302, the active analytics tool 118 can configure a management script 402 associated with a test script 408 of the test script repository 404 to set one or more environment variables (e.g., variables 418) used by the test script 408, where the test script 408 is configured to test a software component (e.g., component 414). The test script repository 404 can include a plurality of test scripts 408A-408N configured to synthesize user interactions with one or more software components. Configuring the management script 402 can include setting a start condition and an end condition to execute a portion of the test script 408. Configuring the management script 402 can also include setting a username, a password, a security model, and a resource location to execute the test script 408 with user permissions set to match permissions of a user account associated with the username.

At block 1304, the active analytics tool 118 can execute the management script 402 at a scheduled frequency to trigger testing of the software component by the test script 408. Script execution can be performed by the script runner 304 of FIG. 3.

At block 1306, the active analytics tool 118 can access one or more results of executing the test script 408. At block 1308, the active analytics tool 118 can compare the one or more results to a plurality of test criteria 128 to determine a test execution summary.

At block 1310, the active analytics tool 118 can trigger an alert 318 to notify a service based on the test execution summary indicating a target condition. The service can be selected from a group of services through the alert profile selector 804. For instance, the service can comprise a message service, an email service, a meeting service, a maintenance request service, or other such service. The service to send the alert 318 can be selectable through a user interface, and an alert recipient list can be configurable on a per service basis.

In some embodiments, the active analytics tool 118 can track a plurality of execution statistics associated with executing the test script 408, store the execution statistics with the test execution summary in a test history log (e.g., as part of the logs 130), and display one or more records of the test history log on a user interface based on a request received through a user interface. The test history log can be configured to track a start time, an end time, a duration, a pass/fail status of a plurality of test runs of the test script 408, and other such information.

In some embodiments, the active analytics tool 118 can perform an analysis of the test script 408 to search for at least one environment variable used by the test script 408 and generate a list of environment variables to be populated by the management script 402 prior to executing the test script 408.

In some embodiments, the management script 402 can be configured to change at least one input used by the test script 408 during execution of the test script 408. This can support dynamic testing, for instance, to test a range of conditions, such as maximum and minimum values of parameters. Here, "during execution", can include time between sequential script execution as part of a larger script execution process. Further, changes made during script execution can include insertion of error conditions to determine whether the errors are handled properly.

In some embodiments, a plurality of management scripts 402 can be sequenced to execute and collect test data from execution of a plurality of test scripts 408A-408N.

In some embodiments, the active analytics tool 118 can analyze one or more results to check one or more of: a search engine optimization result, tracking module parameters, cookies, text content, and a document object model validation status.

Turning now to FIG. 14, a process flow 1400 is depicted according to an embodiment. The process flow 1400 includes a number of steps that may be performed in the depicted sequence or in an alternate sequence. The process flow 1400 may be performed by the system 100 of FIG. 1. The process flow 1400 is described in reference to FIGS. 1-14 and can be performed by the active analytics tool 118 and/or other components of the system 100. The process flow 1400 can be performed as part of the process flow 1300 of FIG. 13 to support test script configuration and execution.

At block 1402, the active analytics tool 118 can access one or more external sources 105 through a network 110 to determine at least one value of the one or more environment variables. At block 1404, the active analytics tool 118 can set the at least one value of the one or more environment variables based on accessing the one or more external sources 105. At block 1406, the active analytics tool 118 can set the at least one value of the one or more environment variables to a default value based on detecting an error when attempting to access the one or more external sources 105. For example, if the external sources 105 cannot be reached, then a default value can be used in place of data from the external sources 105. At block 1408, the active analytics tool 118 can record the error in a test log (e.g., in logs 130) associated with testing of the software component.

Turning now to FIG. 15, a process flow 1500 is depicted according to an embodiment. The process flow 1500 includes a number of steps that may be performed in the depicted sequence or in an alternate sequence. The process flow 1500 may be performed by the system 100 of FIG. 1. The process flow 1500 can expand upon the process flow 1300 of FIG. 13. The process flow 1500 is described in reference to FIGS. 1-15.

At block 1502, the active analytics tool 118 can capture one or more screen shots 1110 associated with testing of the software component as the test script 408 is executing. At block 1504, the active analytics tool 118 can analyze the one or more screen shots 1110 for text, graphic, and object content. At block 1506, the active analytics tool 118 can compare an observed layout of the one or more screen shots 1110 to a layout template 500. The layout template 500 can identify one or more regions 504A-504C of the observed layout to analyze for variance scoring. At block 1508, the active analytics tool 118 can determine a variance score based on detecting a difference between the observed layout and the layout template 500. At block 1510, the active analytics tool 118 can log a variance notification based on the variance score indicating a deviation beyond a threshold level. In some embodiments, the active analytics tool 118 can scan the text for personally identifiable information and verify that the display of personally identifiable information complies with one or more security rules. In some embodiments, the active analytics tool 118 can use the PII predictor 1210 to scan the text for PII and use the variance predictor 1212 to determine a variance score based on detecting a difference between the observed layout and the layout template 500. The layout template 500 can be learned or adapted. For example, an initial combination of images on a web page may be captured as the layout template 500 without specifically identifying regions within the web page. If a change to the web page is detected, a user may be notified to confirm whether the change should be the basis for a new/adjusted layout template or whether it is an unexpected variance. Change detection can be performed for various viewable regions or can span larger areas that extend beyond a currently viewable area. For example, layout templates can be compared as scrolling is performed and previously non-viewable content moves into a viewable area.

Turning now to FIG. 16, a process flow 1600 is depicted according to an embodiment. The process flow 1600 includes a number of steps that may be performed in the depicted sequence or in an alternate sequence. The process flow 1600 may be performed by the system 100 of FIG. 1. The process flow 1600 can expand upon the process flow 1300 of FIG. 13. The process flow 1600 is described in reference to FIGS. 1-16.

At block 1602, the active analytics tool 118 can execute the test script 408 on demand in response to a start command received through a user interface, such as user interface 700. At block 1604, the active analytics tool 118 can pause the test script 408 during execution of the test script 408 in response to a pause command received through the user interface. At block 1606, the active analytics tool 118 can edit at least one of the one or more environment variables through the user interface. At block 1608, the active analytics tool 118 can display contents of the test script 408 in response to a view script command received through the user interface. At block 1610, the active analytics tool 118 can set the scheduled frequency for executing the test script through the user interface. At block 1612, the active analytics tool 118 can set a number of retries of executing the test script 408 before declaring a failure, where the failure can comprise a target condition. Test script execution can also be triggered by one or more external tools 320, for example, through frontend APIs 312 of FIG. 3. Adjustment to test configuration may also be performed through frontend APIs 312 and/or backend APIs 316 by one or more external tools 320. For instance, the scheduled frequency for executing a test script and/or a number of retries may be modified by the external tools 320 in an automated mode of operation.

Technical effects include providing a framework to manage and measure synthetic user activity within a system. Embodiments support script modularization by allowing a same script to be reused in different environments and execution contexts. Modularization can allow part of a script, such as only a step, to run where less than a complete script is needed. Embodiments can also obtain or call external values from environment variables and/or external sources for added flexibility. Response and results of running test scripts for one or more software components can be interrogated to analyze content, consistency, and other such features. Image variance analysis can score differences between observed content output by a software component as compared to expected content. A variety of script languages can be used, including a sequence of scripts written in different script languages as part of a larger-scale test process.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded on to a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G, 4G, 5G, etc.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
a network interface configured to access a test script repository comprising a plurality of test scripts configured to synthesize user interactions with one or more software components;
a processing system in communication with the network interface; and
a memory system in communication with the processing system, the memory system storing instructions that when executed by the processing system result in:
performing an analysis, by a script analyzer executed by the processing system, of a test script of the plurality of test scripts, wherein the analysis comprises searching the test script for at least one environment variable determined to be used by the test script to test a software component;
prior to executing the test script, generating, by the script analyzer, a list of environment variables to be populated by a management script, wherein the list of environment variables comprises one or more environment variables identified based on the searching;
configuring the management script to set one or more values of the one or more environment variables of the list of environment variables to be used by the test script the test script configured to test the software component;
executing the management script at a scheduled frequency to trigger testing of the software component by the test script using the one or more values of the one or more environment variables as set by the management script;
accessing one or more results of executing the test script;
comparing the one or more results to a plurality of test criteria to determine a test execution summary; and
triggering an alert to notify a service based on the test execution summary indicating a target condition.

2. The system of claim 1, wherein configuring the management script comprises setting a start condition and an end condition to execute a portion of the test script.

3. The system of claim 1, wherein configuring the management script comprises setting a username, a password, a security model, and a resource location to execute the test script with user permissions set to match permissions of a user account associated with the username.

4. The system of claim 1, further comprising instructions that when executed by the processing device result in:
accessing one or more external sources through a network to determine at least one value of the one or more environment variables; and
setting the at least one value of the one or more environment variables based on accessing the one or more external sources.

5. The system of claim 4, further comprising instructions that when executed by the processing device result in:
setting the at least one value of the one or more environment variables to a default value based on detecting an error when attempting to access the one or more external sources; and
recording the error in a test log associated with testing of the software component.

6. The system of claim 1, further comprising instructions that when executed by the processing device result in:
capturing one or more screen shots associated with testing of the software component as the test script is executing; and analyzing the one or more screen shots for text, graphic, and object content.

7. The system of claim 6, further comprising instructions that when executed by the processing device result in:

scanning the text for personally identifiable information; and verifying that the display of the personally identifiable information complies with one or more security rules.

8. The system of claim 6, further comprising instructions that when executed by the processing device result in:

comparing an observed layout of the one or more screen shots to a layout template;

determining a variance score based on detecting a difference between the observed layout and the layout template; and logging a variance notification based on the variance score indicating a deviation beyond a threshold level.

9. The system of claim 8, wherein the layout template identifies one or more regions of the observed layout to analyze for variance scoring.

10. The system of claim 1, further comprising instructions that when executed by the processing device result in:

tracking a plurality of execution statistics associated with executing the test script;

storing the execution statistics with the test execution summary in a test history log; and displaying one or more records of the test history log on a user interface based on a request received through a user interface.

11. The system of claim 10, wherein the test history log is configured to track a start time, an end time, a duration, and a pass or fail status of a plurality of test runs of the test script.

12. The system of claim 1, further comprising instructions that when executed by the processing device result in:

executing the test script on demand in response to a start command received through a user interface;

pausing the test script during execution of the test script in response to a pause command received through the user interface;

editing at least one of the one or more environment variables through the user interface; and displaying contents of the test script in response to a view script command received through the user interface.

13. The system of claim 12, further comprising instructions that when executed by the processing device result in:

setting the scheduled frequency for executing the test script through the user interface; and setting a number of retries of executing the test script before declaring a failure, wherein the failure comprises the target condition.

14. The system of claim 1, further comprising instructions that when executed by the processing device result in:

configuring the management script to change at least one input used by the test script during execution of the test script.

15. The system of claim 1, further comprising instructions that when executed by the processing device result in:

sequencing a plurality of management scripts to execute and collect test data from execution of a plurality of test scripts.

16. The system of claim 1, further comprising instructions that when executed by the processing device result in:

analyzing the one or more results to check one or more of: a search engine optimization result, tracking module parameters, cookies, text content, and a document object model validation status.

17. The system of claim 1, wherein the service to send the alert is selectable through a user interface, and an alert recipient list is configurable on a per service basis.

18. A computer program product comprising a non-transitory storage medium embodied with computer program instructions that when executed by a computer cause the computer to implement:

accessing, by a script analyzer executed by the computer, a test script repository comprising a plurality of test scripts configured to synthesize user interactions with one or more software components;

performing, by the script analyzer, an analysis of a test script of the plurality of test scripts, wherein the analysis comprises searching the test script for at least one environment variable determined to be used by the test script to test a software component;

prior to executing the test script, generating, by the script analyzer, a list of environment variables to be populated by a management script, wherein the list of environment variables comprises one or more environment variables identified based on the searching;

configuring the management script to set one or more values of the one or more environment variables of the list of environment variables to be used by the test script, test script configured to test the software component;

executing the management script at a scheduled frequency to trigger testing of the software component by the test script using the one or more values of the one or more environment variables as set by the management script;

accessing one or more results of executing the test script;

comparing the one or more results to a plurality of test criteria to determine a test execution summary; and triggering an alert to notify a service based on the test execution summary indicating a target condition.

19. The computer program product of claim 18, wherein configuring the management script comprises setting a start condition and an end condition to execute a portion of the test script, and setting a username, a password, a security model, and a resource location to execute the test script with user permissions set to match permissions of a user account associated with the username.

20. The computer program product of claim 18, further comprising computer program instructions that when executed by the computer cause the computer to implement:

accessing one or more external sources through a network to determine at least one value of the one or more environment variables;

setting the at least one value of the one or more environment variables based on accessing the one or more external sources;

setting the at least one value of the one or more environment variables to a default value based on detecting an error when attempting to access the one or more external sources; and recording the error in a test log associated with testing of the software component.

21. The computer program product of claim 18, further comprising computer program instructions that when executed by the computer cause the computer to implement:

capturing one or more screen shots associated with testing of the software component as the test script is executing;

analyzing the one or more screen shots for text, graphic, and object content comparing an observed layout of the one or more screen shots to a layout template;

determining a variance score based on detecting a difference between the observed layout and the layout template; and logging a variance notification based on the variance score indicating a deviation beyond a threshold level.

22. The computer program product of claim 18, further comprising computer program instructions that when executed by the computer cause the computer to implement:

tracking a plurality of execution statistics associated with executing the test script;

storing the execution statistics with the test execution summary in a test history log, wherein the test history log is configured to track a start time, an end time, a duration, and a pass or fail status of a plurality of test runs of the test script; and displaying one or more records of the test history log on a user interface based on a request received through a user interface.

23. The computer program product of claim 18, further comprising computer program instructions that when executed by the computer cause the computer to implement:

setting the scheduled frequency for executing the test script through the user interface;

setting a number of retries of executing the test script before declaring a failure, wherein the failure comprises the target condition;

executing the test script on demand in response to a start command received through a user interface;

pausing the test script during execution of the test script in response to a pause command received through the user interface;

editing at least one of the one or more environment variables through the user interface; and displaying contents of the test script in response to a view script command received through the user interface.

24. The computer program product of claim 18, further comprising computer program instructions that when executed by the computer cause the computer to implement:

configuring the management script to change at least one input used by the test script during execution of the test script; and sequencing a plurality of management scripts to execute and collect test data from execution of a plurality of test scripts.

\* \* \* \* \*